(12) United States Patent
Sumser et al.

(10) Patent No.: US 7,798,770 B2
(45) Date of Patent: Sep. 21, 2010

(54) TURBINE WHEEL IN AN EXHAUST GAS TURBINE OF AN EXHAUST GAS TURBOCHARGER

(75) Inventors: Siegfried Sumser, Stuttgart (DE); Wolfram Schmid, Nürtingen (DE)

(73) Assignee: Daimler AG, Stuttgart (DE)

(*) Notice: Subject to any disclaimer, the term of this patent is extended or adjusted under 35 U.S.C. 154(b) by 852 days.

(21) Appl. No.: 11/641,602

(22) Filed: Dec. 19, 2006

(65) Prior Publication Data

US 2007/0128018 A1 Jun. 7, 2007

Related U.S. Application Data

(63) Continuation-in-part of application No. PCT/EP2005/006286, filed on Jun. 11, 2005.

(30) Foreign Application Priority Data

Jun. 19, 2004 (DE) .................... 10 2004 029 830

(51) Int. Cl.
*F01D 5/14* (2006.01)

(52) U.S. Cl. .................... 415/157; 415/158; 60/602; 416/185; 416/188; 416/223 A; 416/DIG. 2; 416/DIG. 5

(58) Field of Classification Search ................ 415/157, 415/158; 416/185, 188, 223 A, 223 R, 243, 416/DIG. 2, DIG. 5; 60/602
See application file for complete search history.

(56) References Cited

U.S. PATENT DOCUMENTS

| 5,094,587 | A | 3/1992 | Woollenweber |
| 6,374,611 | B2 * | 4/2002 | Doring et al. ............... 415/157 |
| 7,086,837 | B2 * | 8/2006 | Kamoshita et al. .......... 416/185 |

FOREIGN PATENT DOCUMENTS

DE 102 12 032 10/2003

OTHER PUBLICATIONS

H. Moustapha et al. "Axial and Radial Turbines", Concepts ETI inc., p. 303, 2003.

* cited by examiner

*Primary Examiner*—Christopher Verdier
(74) *Attorney, Agent, or Firm*—Klaus J. Bach

(57) ABSTRACT

In a turbine wheel of an exhaust gas turbine comprising a turbine wheel with a hub and a plurality of turbine wheel blades which are arranged on the turbine wheel hub and which extend axially between a turbine wheel inlet and a turbine wheel outlet, the turbine wheel blades are constructed in such a way that the ratio of the hub contour thickness to the external contour thickness of each turbine wheel blade follows a defined function.

4 Claims, 3 Drawing Sheets

TURBINE WHEEL IN AN EXHAUST GAS TURBINE OF AN EXHAUST GAS TURBOCHARGER

This is a Continuation-In-Part Application of pending international patent application PCT/EP2005/006286 filed Jun. 11, 2005 and claiming the priority of German patent application 10 2004 029 830.0 filed Jun. 19, 2004.

BACKGROUND OF THE INVENTION

The invention relates to a turbine wheel in an exhaust gas turbine of an exhaust gas turbocharger with a wheel hub and a plurality of blades arranged on the wheel hub and extending axially between the turbine inlet and the turbine outlet.

The document DE 102 12 032 A1 discloses an exhaust gas turbocharger for an internal combustion engine, composed of a compressor in the intake section of the internal combustion engine and an exhaust gas turbine in the exhaust section, said turbine being driven by the pressurized exhaust gases, the rotational movement being transmitted to the compressor wheel which subsequently compresses ambient air to a raised charge pressure which is fed to the cylinders of the internal combustion engine. A variably adjustable guide grating is mounted in the turbine inlet cross section, upstream of the turbine wheel of the exhaust gas turbine, as a result of which the effective turbine inlet cross section can be set to a desired value as a function of the current operating state of the internal combustion engine. As a result, the behavior of the internal combustion engine can be optimized both in the engine braking mode and in the fired drive operating mode. In the engine braking mode, the guide grating is moved into a choked position which reduces the flow inlet cross section and as a result of which the exhaust gases are choked upstream of the exhaust gas turbine and the internal combustion engine has to perform additional compressor work counter to the raised exhaust, which leads to a significant increase in engine braking power. In contrast, in the fired drive operating mode the guide grating is adjusted to an open position which makes the flow inlet cross section larger, in order to increase the power of the engine so that a maximum throughput of exhaust gas through the exhaust gas turbine is possible.

During high engine braking power operation, the turbine wheel is stressed to a maximum when the engine is operated in the engine braking mode. The high exhaust gas back pressure leads, in conjunction with the reduced flow cross section, to high speed compression surges which can destroy the turbine wheel blades when the surges strike the turbine wheel. In order to avoid such destruction it is necessary to ensure that the turbine wheel blades are not excited to oscillate in any way up to the region of their first natural frequency since otherwise the risk of fracturing would substantially increase. In order to counteract this, it is possible, for example, to increase the thickness of the turbine wheel blades. However, this entails an undesired increase in the mass inertia, as a result of which the transient behavior of the exhaust gas turbocharger would deteriorate. Furthermore, the turbine would less willingly accelerate, which is needed for increasing the engine power, output and particularly in the engine braking mode.

U.S. Pat. No. 5,094,587 discloses an exhaust gas turbocharger for an internal combustion engine having a compressor in the intake section and an exhaust gas turbine in the exhaust section of the engine. The turbine wheel is driven by the exhaust gases of the engine which are expelled under pressure, the rotational movement of the turbine wheel being transmitted via a shaft to the compressor wheel which subsequently sucks in ambient air and compresses it to a raised charge pressure which is fed to the inlets of the internal combustion engine. In the turbine housing of the exhaust gas turbine, two exhaust gas flows are formed, via each of which exhaust gas is fed to the turbine wheel. The two exhaust gas flows open into a semi-axial or semi-radial position onto the turbine wheel blades which are arranged on the turbine wheel hub. The exhaust gas of the exhaust gas flows which impacts on the turbine wheel blades in the semi-axial or semi-radial direction is deflected in the turbine wheel into an axial flow and leaves the turbine wheel axially. In order to be able to absorb the high loads which occur during operation at the high rotational speeds, the turbine wheel blades have an increased thickness in the region of the connection to the turbine wheel hub.

It is the object of the present invention to provide, with simple measures, a turbine wheel in an exhaust gas turbine of an exhaust gas turbocharger which is configured for a long service life and to withstand high power levels as they may be present in particular in the engine braking mode of operation.

SUMMARY OF THE INVENTION

In a turbine wheel of an exhaust gas turbine comprising a turbine wheel hub and a plurality of turbine wheel blades, which are arranged on the turbine wheel hub and which extend axially between a turbine wheel inlet and a turbine wheel outlet, the turbine wheel blades are constructed in such a way that the ratio of the hub contour thickness to the external contour thickness of each turbine wheel blade follows a pre-defined function.

The turbine wheel blades are constructed in such a way that the ratio of the hub contour thickness to the external contour thickness of each turbine wheel blade, at least for the axial half of the turbine wheel which is adjacent to the turbine wheel outlet, is greater than or if appropriate also equal to the value 8 so that the hub contour thickness is at least eight times larger than the external contour thickness. This thickness ratio for the turbine wheel blades ensures that each blade is made relatively thick in the region of the turbine wheel hub and is made relatively thin in the region of its external contour. The fact that, with the design according to the invention, the blades are relatively thin in the region of the external contour meets requirements for high turbine efficiency levels. The moment of mass inertia is kept comparatively low, which enhances a rapid increase or change in the turbine rotational speed and at the same time a super-proportional increase in power of the exhaust gas turbine in the transient mode. The fact that the hub area is at the same time constructed with relatively thick walls ensures sufficient stability even at the increased turbine rotated speeds.

Since increasing the charger speed by, for example, 10% already leads to an increase in the engine braking power of approximately 30%, measures for increasing the rotational speed of the exhaust gas turbocharger leads to a super-proportional increase in the engine braking power levels. The inventive configuration of the turbine wheel blades, in particular as a result of the comparatively thick-walled construction in the region of the wheel hub, results in a significant increase in the first natural frequency of the turbine wheel, as a result of which a sufficient distance from the resonant speed can be maintained even at raised charger speeds. The risk of the blades fracturing is thus considerably reduced.

A turbine wheel which is constructed in this way can be used in a particularly advantageous way in an exhaust gas turbine which is equipped with variable turbine geometry for variably setting the effective turbine inlet cross section. Such variable turbine geometries are used to increase power both in the engine braking mode and in the fired drive operating mode. In particular a guide grating which is arranged in the turbine inlet cross section and has adjustable guide blades is considered for the variable turbine geometry. The variable turbine geometry is basically to be adjusted between a choked position with minimum flow cross section and an open position with a flow cross section which is opened to the maximum extent. Using a variable turbine geometry in the exhaust gas turbine leads to increased loading of the turbine wheel since high speed compression surges can occur in particular when there is a variable turbine geometry between adjacent guide blades in the choked position, and said surges can impact on the turbine wheel. Such increased loads can, however, also be compensated by the prescribed construction of the turbine wheel blades.

The profile of the blade wheel thickness in the radial direction between the hub contour and the external contour expediently follows a power function depending on the current radius of the turbine wheel blade, the exponent of the power function advantageously assuming a value greater than 1 and less than 2, in particular less than or equal to 1.2. This means that the blade wheel thickness adjacent to the turbine wheel hub is made disproportionately thicker than in the region of the external contour of the turbine wheel.

According to a further expedient embodiment there is provision for the axial end wall, adjacent to the turbine wheel inlet, of the turbine wheel to extend radially up to the greatest external diameter of the turbine wheel blades. This greater radial extent of the end wall or rear wall of the turbine wheel compared to the prior art enables efficiency advantages of over 2% to be obtained, possibly even up to over 5% in the case of dual-flow asymmetrical turbine housings since false flows and undesired eddying are reduced or even completely eliminated. In order to keep the increase in mass inertia and rigidity of the wall in the external wheel region low, the axial thickness of the end wall is expediently selected to be less than 1% of the greatest external diameter of the turbine wheel blades.

The invention will become more readily apparent from the following description thereof on the basis of accompanying drawings.

DESCRIPTION OF A PARTICULAR EMBODIMENT

Figure 1:
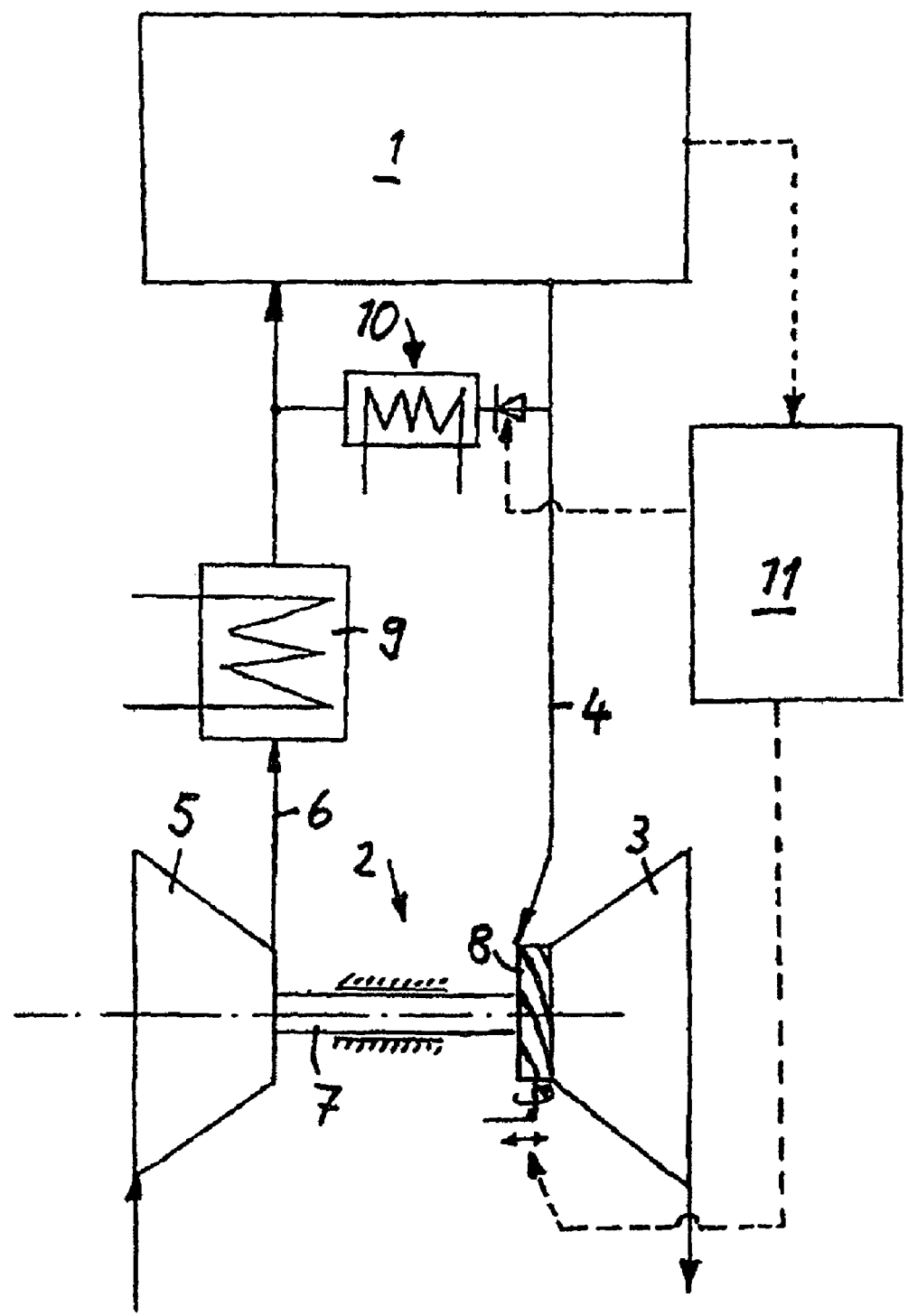
FIG. 1 is a schematic illustration of the internal combustion engine with an exhaust gas turbocharger whose exhaust gas turbine is equipped with a variable turbine geometry.

The internal combustion engine 1 illustrated in FIG. 1—a diesel internal combustion engine or a spark ignition engine—is a supercharged engine with an exhaust gas turbocharger 2 which comprises an exhaust gas turbine 3 in the exhaust section 4 of the internal combustion engine and a compressor 5 in the intake section 6. The turbine wheel of the exhaust gas turbine 3 and the compressor wheel of the compressor 5 are rotationally coupled by means of a shaft 7. In the fired drive operating mode of the internal combustion engine the exhaust gases which are expelled from the engine under pressure drive the turbine wheel, the rotational movement of which is transmitted via the shaft 7 to the compressor wheel, as a result of which ambient air is sucked in and compressed to a raised charge pressure. In order to improve the supercharging, the exhaust gas turbine 3 is equipped with a variable turbine geometry 8 which is constructed in particular as a guide grating ring in the turbine inlet cross section with adjustable guide blades.

The combustion air which is compressed by the compressor 5 is cooled in a charge air cooler 9 arranged downstream of the compressor in the intake section 6, and is subsequently fed under charge pressure to the cylinders of the internal combustion engine 1. On the exhaust gas side, the exhaust gases flow via the exhaust section 4 into the exhaust gas turbine 3, drive the turbine wheel and subsequently exit the exhaust gas turbine in the relaxed state and are then fed to exhaust gas treatment.

Furthermore, the internal combustion engine 1 includes an exhaust gas recirculation device 10 which comprises a recirculation line extending between the exhaust section 4 upstream of the exhaust gas turbine 3 and the intake section 6 downstream of the charge air cooler 9. An adjustable valve and an exhaust gas cooler are arranged in the recirculation line.

All the adjustable assemblies which are assigned to the internal combustion engine 1 are set as a function of state variables and operating variables of the internal combustion engine by means of a closed-loop and open-loop controller unit 11, these being, for example, the variable turbine geometry 8 and also the valve in the exhaust gas recirculation device 10.

Figure 2:
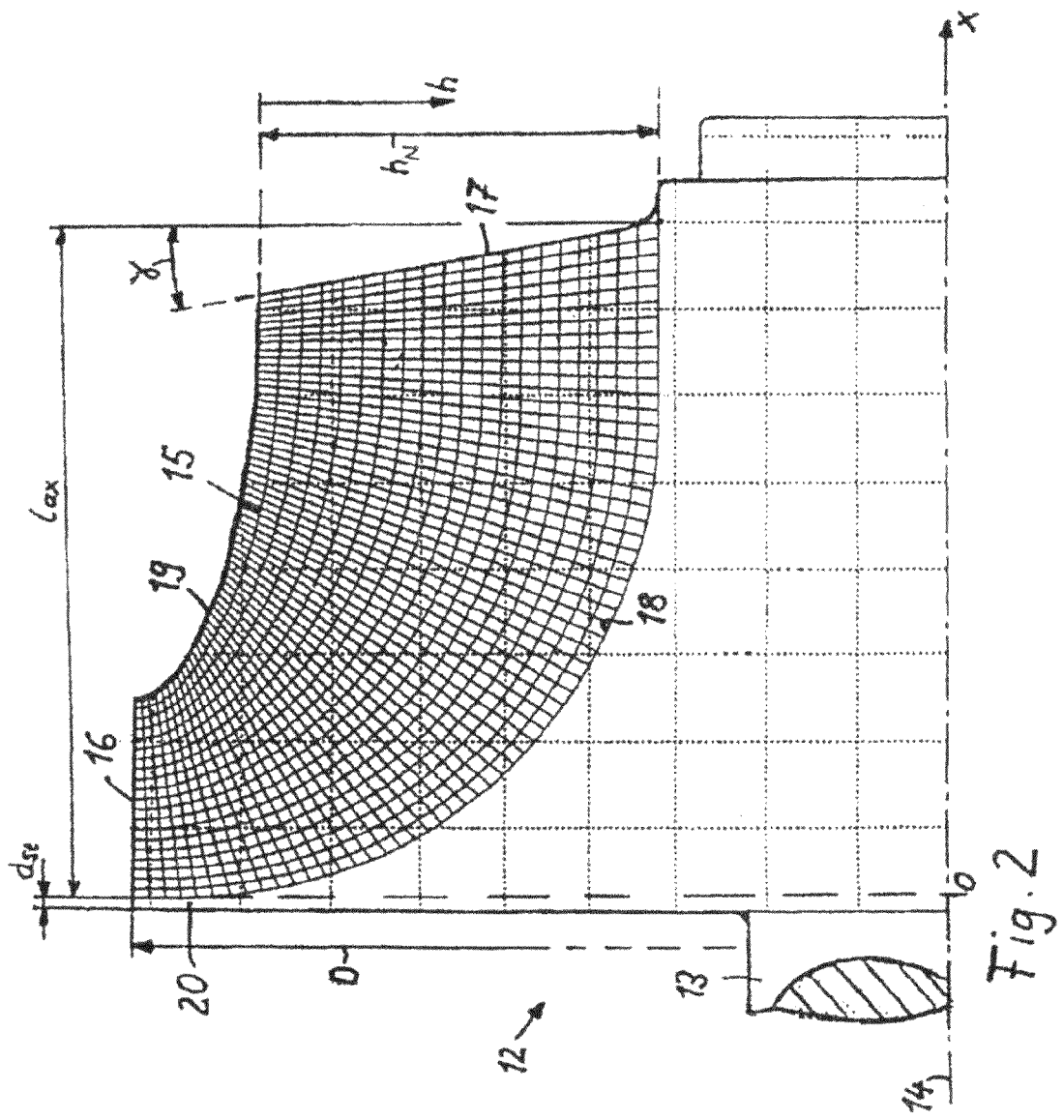
FIG. 2 shows an exhaust gas turbine in a side view.

The turbine wheel 12 which is illustrated in FIG. 2 has a turbine wheel hub 13 which extends in the axial direction of the wheel axis 14 and turbine wheel blades 15 which are seated on the turbine wheel hub, are distributed over the circumference and are embodied in particular in one piece with the turbine wheel hub. In the illustration according to FIG. 2, the illustrated turbine wheel blade 15 is covered with a grating mesh which characterizes the profile or the orientation of the turbine wheel blade 15 which is curved three dimensionally.

The turbine wheel blades 15 extend between a radial turbine wheel inlet which is characterized by the turbine wheel inlet edge 16 and via which the exhaust gases of the internal combustion engine flow radially against the turbine wheel, and a turbine wheel outlet which is characterized by the axial turbine wheel outlet edge 17. The illustrated turbine wheel 12 is therefore suitable for use in radial turbines. The turbine wheel outlet edge 17 encloses with a plane perpendicular to the wheel axis 14 a certain angle y by which the radially external regions of the turbine wheel blades 15 are set back. The angle expediently lies in a value range between 5° and 20° and is in particular approximately 10°.

The turbine wheel blades 15 are located radially between the hub contour 18 of the turbine wheel hub 13 and the external contour 19 which envelops the turbine wheel blades radially. The blade wheel thickness d of each turbine wheel blade 15 between the hub contour 18 and the external contour 19 on any desired axial position expediently follows the function $$d = d_a + (d_n - d_a)(h/h_N)^{ex}$$

wherein, h designates the current radial position in the region of the turbine wheel blade, starting from the external diameter and extending radially inwards. $h_N$ is the radial extent between the turbine wheel hub and external diameter, ex designates an exponent which lies in the value range between 1 and 2 and assumes in particular a value less than or equal to 1.2. $d_n$ designates the hub contour thickness of the turbine wheel blade in the region of the hub contour 18, and $d_a$ designates the external contour thickness of the turbine wheel blade in the region of the radially outer external contour 19 (see also FIG. 3). The lines of the grating mesh which are illustrated in FIG. 2 between the turbine wheel inlet edge 16 and the turbine wheel outlet edge 17 are height lines in the turbine wheel blades, with the distance from the hub contour 18 or from the external contour 19 remaining constant along a height line.

The turbine wheel blades 15 extend over the axial length $l_{ax}$ in the axial direction. The turbine wheel inlet edge 16 is bounded axially by the rear or end wall 20 which extends radially up to the greatest external diameter D of the turbine wheel blades; the turbine wheel inlet edge 16 is also located in the region of this greatest external diameter D. The turbine wheel blades 15 directly adjoin the end wall 20 in the axial direction and extend axially up to the wheel outlet edge 17.

The axial thickness $a_{St}$ of the end wall 20 is advantageously less than 1% of the greatest external diameter D of the turbine wheel blades 15:

$$a_{St}<0.01D.$$

This condition for the thickness $a_{St}$ for the end wall 20 ensures that the moment of mass inertia of the turbine wheel 12 is increased only slightly despite the large radial extent of the end wall. This is the price paid for the advantages of the improved flow profile and increased stability.

Figure 3:
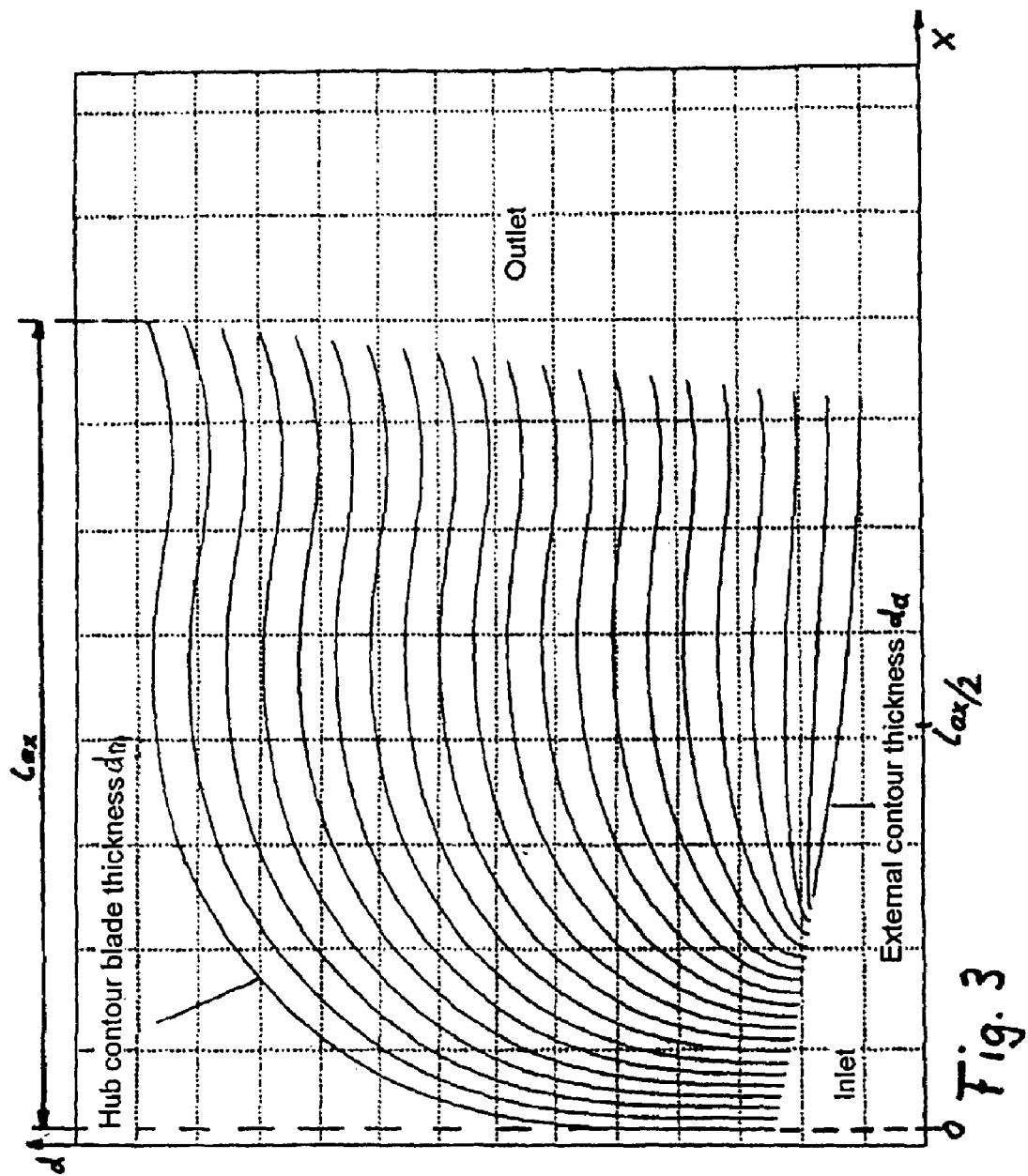
FIG. 3 is a diagram showing the profile of the blade thickness of the turbine wheel blades as a function of the current axial position, represented in the profile between the turbine wheel inlet and turbine wheel outlet for a plurality of radial spacing positions between the wheel hub contour and external contour.

The lines illustrated in FIG. 3 correspond to the eight lines from FIG. 2 which extend between the turbine heel inlet and the turbine wheel outlet and which are each at a constant distance both from the hub contour and from the external contour. The group of curves according to FIG. 3 is bounded downwards by the line which lies directly in the region of the external contour, each turbine wheel blade having the thickness $d_a$ in the region of the external contour. In the upward direction, the group of curves is bounded by the line directly in the region of the hub contour, the turbine wheel blades have the blade thickness $d_n$ in the region of the hub contour.

The turbine wheel blades 15 are constructed in such a way that the ratio of the hub contour thickness $d_n$ to the external contour thickness $d_a$ of each turbine wheel blade follows the function $$d_n/d_a>8$$

this relation applying only in the axial half of the turbine wheel which faces the turbine wheel outlet and which is characterized by $$x/l_{ax}>0.5$$

wherein x designates the current axial position starting from the inside of the end wall 20, adjacent to the turbine wheel inlet, of the turbine wheel.

In the intermediate region between the external contour and the hub contour the blade wheel thickness d of each turbine wheel blade follows the abovementioned power function which depends on the current radial position.

What is claimed is:

1. A turbine wheel in an exhaust gas turbine (3) of an exhaust gas turbocharger (2), said turbine wheel (12) having a hub (13) and a plurality of turbine wheel blades (15) arranged on the turbine wheel hub (13) and extending axially between a radial turbine wheel inlet area (16) and an axial turbine wheel outlet area (17), the turbine wheel blades (15) having the greatest external diameter (D) in the region of the turbine wheel inlet area (16), an end wall (20) adjacent to the turbine wheel inlet area (16) of the turbine wheel (12) extending radially as far as the greatest external diameter (D) of the turbine wheel blades (15) and the turbine wheel blades (15) being constructed in such a way that the ratio of the hub contour thickness ($d_n$) to the external contour thickness ($d_a$) of each turbine wheel blade (15) in the axial half facing the turbine wheel outlet (17) of the turbine wheel (12) follows the function $$d_n/d_a>8 \text{ for } x/l_{ax}>0.5,$$

wherein
  $d_n$ designates the hub contour thickness of turbine wheel blade (15),
  $d_a$ designates the external contour thickness of a turbine wheel blade (15),
  x designates the current axial position starting from the end wall, adjacent to the turbine wheel inlet (16) of the turbine wheel (12), and
  $l_{ax}$ designates the axial overall length of the turbine wheel (12), each turbine wheel blade (15) having a thickness (d) between a hub contour (18) and an external contour (19) which follows the function $$d=d_a+(d_n-d_a)(h/h_N)^{ex},$$

wherein
  d designates the current blade wheel thickness
  h designates the current radial position in the region of the turbine wheel blade (15) starting from the external diameter and extending radially inwards,
  $h_N$ designates the radial extent between the turbine wheel hub (13) and external diameter, and
  ex designates an exponent in the range $1 \leq ex \leq 2$.

2. The turbine wheel as claimed in claim 1, wherein the exponent (ex) assumes a value of maximally 1.2.

3. The turbine wheel as claimed in claim 1, wherein axial thickness ($a_{st}$) of the end wall (20) is less than 1% of the greatest external diameter (D) of the turbine wheel blades (15):

$$a_{st}<0.01D.$$

4. An exhaust gas turbocharger for an internal combustion engine (1) including a compressor (5) and an exhaust gas turbine (3) with a turbine wheel with a turbine wheel hub (13) and a plurality of turbine wheel blades (15) arranged on the turbine wheel hub (13) and extending axially between a radial turbine wheel inlet (16) and an axial turbine wheel outlet (17), the turbine wheel blades (15) having the greatest external diameter (D) in the region of the turbine wheel inlet edge (16), an end wall (20), adjacent to the turbine wheel inlet (16) of the turbine wheel (12) extending radially as far as the greatest external diameter (D) of the turbine wheel blades (15) and the turbine wheel blades (15) being constructed in such a way that the ratio of the hub contour thickness ($d_n$) to the external contour thickness ($d_a$) of each turbine wheel blade (15) in the axial half facing the turbine wheel outlet (17) of the turbine wheel (12) follows the function $$d_n/d_a>8 \text{ for } x/l_{ax}>0.5,$$

wherein
  $d_n$ designates the hub contour thickness of a turbine wheel blade (15),
  $d_a$ designates the external contour thickness of a turbine wheel blade (15), x designates the current axial position starting from the end wall, adjacent to the turbine wheel inlet (16) of the turbine wheel (12), and $l_{ax}$ designates the axial overall length of the turbine wheel (12), the exhaust gas turbine (3) being equipped with a variable turbine geometry (8) for variably setting the effective turbine inlet flow cross section, the turbine wheel blades (15) having each a thickness (d) between an inner contour (18) of the wheel hub (13) and an external contour of the turbine wheel blades (15), the thickness (d) follows the function:

$$d = d_a + (d_n - d_a)(h/h_N)^{ex}$$

wherein d designates the current blade wheel thickness h designates the current radial position in the region of the turbine wheel blade (15) starting from the external diameter and extending radially inwards, $h_N$ designates the radial extent between the turbine wheel hub (13) and external diameter, and ex designates an exponent in the range $1 \leq ex \leq 2$.

* * * * *